United States Patent Office 3,531,472
Patented Sept. 29, 1970

3,531,472
CYCLIC HYDROXAMIC ACID DERIVATIVES
Michio Nakanishi, Oita Nakatsu, and Tadao Okada and Takanori Oe, Chikujogun, Fukuoka, Japan, assignors to Yoshitomi Pharmaceutical Industries, Ltd., Osaka, Japan
No Drawing. Filed Apr. 8, 1968, Ser. No. 719,757
Claims priority, application Japan, Apr. 8, 1967, 42/22,520
Int. Cl. C07d 93/42, 89/20, 53/02
U.S. Cl. 260—239.3       17 Claims

ABSTRACT OF THE DISCLOSURE

Cyclic hydroxamic acid derivatives of the formula

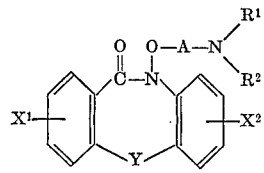

wherein each of $X^1$ and $X^2$ is H, halogen, lower alkyl, lower alkoxy, lower alkylthio or trifluoromethyl, Y is —O—, —S—, —SO$_2$— or —N(R)— (R being lower alkyl), A is alkylene of 2 to 4 carbon atoms, and —N(R$^1$) (R$^2$) is lower alkylamino, di(lower alkyl)amino, cyclohexylamino, (phenyl-lower alkyl)amino, piperidino, morpholino, 4-lower alkyl - 1-piperazinyl or 4-(hydroxy-lower alkyl)-1-piperazinyl, and pharmaceutically acceptable acid addition salts thereof are useful as antiallergic agents or antidepressants.

---

This invention relates to novel cyclic hydroxamic acid derivatives, represented by the formula

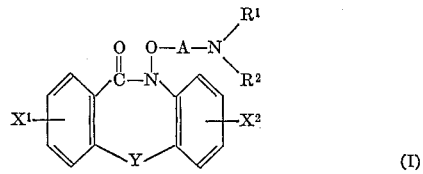

(I)

and to pharmaceutically acceptable acid addition salts thereof, wherein each of $X^1$ and $X^2$ is H, halogen (e.g., Cl, F), lower alkyl, lower alkoxy, lower alkylthio or trifluoromethyl, Y is —O—, —S—, —SO$_2$— or —N(R)— (R being lower alkyl), A is alkylene of two to four carbon atoms, and —N(R$^1$) (R$^2$) is lower alkylamino, di-(lower alkyl)amino, cyclohexylamino, (phenyl-lower alkyl)amino, piperidino, morpholino, 4-lower alkyl-1-piperazinyl or 4-(hydroxylower alkyl) - 1-piperazinyl. In the above definition "lower" means that the alkyl moiety or alkoxy moiety contains not more than 4 carbon atoms. Advantageously, $X^1$ and $X^2$ are each H, Cl, methyl, methoxy, methylthio or trifluoromethyl, and A is ethylene, propylene (methylethylene) or trimethylene. Examples of —N(R$^1$) (R$^2$) are methylamino, isopropylamino, dimethylamino, diethylamino, dibutylamino, cyclohexylamino, benzylamino, phenethylamino, (1-methyl-2-phenylethyl) amino, piperidino, morpholino, 4-methyl - 1-piperazinyl and 4-(2-hydroxyethyl)-1-piperazinyl.

An advantageous subgroup of compounds according to the invention correspond to the formula

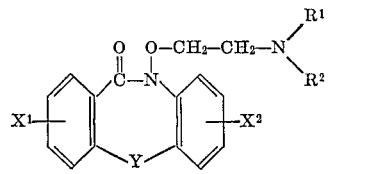

(Ia)

wherein $X^1$ and $X^2$ are the same or different and each is H, Cl, CH$_3$, CH$_3$O, CH$_3$S or CF$_3$, Y is —O—, —S— or —N(CH$_3$)—, and —N(R$^1$) (R$^2$) is methylamino, isopropylamino, dimethylamino, cyclohexylamino, morpholino or 4-(2-hydroxyethyl)-1-piperazinyl.

The aforedescribed compounds are prepared by reacting the appropriate hydroxamic acid of the formula

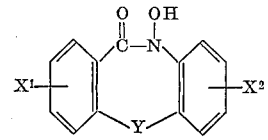

(II)

with the corresponding compound of the formula:

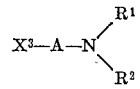

(III)

wherein $X^3$ is halogen or organic sulfonyloxy (e.g., methylsulfonyloxy, p-tolylsulfonyloxy), or by reacting a compound of the formula:

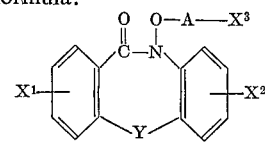

(II')

wherein $X^3$ is halogen or organic sulfonyloxy, with an amine of the formula:

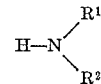

(III')

The reactions can be carried out in a solvent such as water, methanol, ethanol, propanol, butanol, acetone, methyl ethyl ketone, cyclohexanone, pyridine, dioxane, tetrahydrofuran, dimethylformamide, dimethyl sulfoxide or liquid ammonia, advantageously at 20° to 100° C., and advantageously in the presence of an acid binding agent such as sodium hydroxide, potassium hydroxide, sodium methoxide, sodium carbonate, potassium carbonate, pyridine or triethylamine.

The starting compound of the Formula II is produced, for example, by catalytic reduction of a compound of the formula

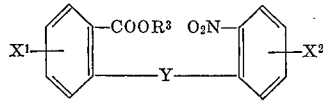

(IV)

wherein $X^1$, $X^2$ and Y have the same meanings as defined above and $R^3$ is lower alkyl, in the presence of hydrogen and Raney nickel, whereby hydrogenation and simultaneous cyclization take place. Specific example is given as follows:

Metallic sodium (15 grams) is dissolved in 2 liters of ethanol. Ethyl o-(o-nitrophenylthio)benzoate (194 grams) and 10 grams of Raney nickel are added. Hydrogenation cyclization is carried out at 10° to 15° C. under atmospheric pressure until 28 liters of hydrogen gas is absorbed. The reaction mixture is then allowed to stand overnight. The Raney nickel is filtered off, and the ethanol is distilled off. The remaining sodium salt is dissolved in a large amount of water, and the solution is acidified with hydrochloric acid to precipitate 10-hydroxy-10,11-dihydrodibenzo[b,f][1,4]thiazepin-11-one. After recrystallization from methanol it melts at 152° to 153° C.

Other starting compounds (II) are analogously prepared.

The starting compound of the Formula II' is produced, for example, by reacting the compound (II) produced as above with a compound of the formula

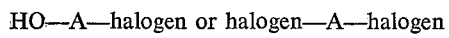

HO—A—halogen or halogen—A—halogen wherein A has the same meaning as defined above and, upon necessity, esterifying the resultant product with an organic sulfonyl chloride. Specific example is given as follows:

10 - hydroxy-10,11-dihydrodibenzo[b,f][1,4]thiazepin-11-one (24 grams) is dissolved in 100 milliliters of dimethylformamide. Potassium carbonate (18 grams) and ethylene bromide (75 grams) are added, and the reaction is carried out at 40° C. for 3 hours. The reaction mixture is poured into a large amount of ice water. An oil layer formed is taken up with methylene chloride. The extract layer is dried over sodium sulfate. After removal of volatile matter by distillation and recrystallization from hexane, there is obtained 22.5 grams of 10-(2-bromoethoxy) - 10,11 - dihydrodibenzo[b,f][1,4]thiazepin - 11 - one melting at 94° to 96° C.

Other starting compounds (II') are analogously prepared.

The compounds of Formula I can be converted in per se conventional manner into acid addition salts with inorganic acids (e.g., hydrochloric, hydrobromic and sulfuric acids, etc.) or organic acids (e.g., oxalic, maleic, fumaric, tartaric, citric and o-(p-hydroxybenzoyl)benzoic acids, etc.).

The compounds of Formula I and pharmaceutically acceptable acid addition salts thereof have histamine-, acetylcholine- and reserpine-antagonizing activities as shown, for example, by the following tests:

The test for histamine antagonistic activity was made according to the method described by J. M. van Rossum et al. in Archives Internationales de Pharmacodynamie et de Therapie, vol. 143, pages 240–246 and 299–330 (1963) and the test for reserpine antagonistic activity was performed essentially in accordance with the method described by R. Fielden et al. in "Methods in Drug Evaluation," pages 149–157 (North-Holland Publishing Company, Amsterdam, 1966; editors: P. Mantegazza and F. Piccinini). $pA_2$ is the negative of the logarithm, to the base 10, of the molar concentration of the test compound which reduces the effect of twice dose of histamine on contracting action of the guinea pig intestine in vivo to that of a single dose; $RD_{20}$ is the subcutaneous dose of the test compound which prevents ptosis caused by the administration of reserpine in 20% of the animals.

| Test compound* | Histamine antagonistic activity, $pA_2$ | Reserpine antagonistic activity, $RD_{20}$ (mouse), mg./kg. |
|---|---|---|
| A | 7.83 | 10 |
| B | 6.9 | 15 |
| C | 7.78 | 7.5 |
| D | 7.63 | 15 |
| E | 7.67 | 15 |
| F | 7.67 | 60 |
| G | 5.81 | 60 |
| H | 7.6 | 15 |
| I | 6.7 | 10 |
| J | 5.37 | 40 |
| K | 6.8 | 15 |
| L | 7.2 | 3.5 |

*Remarks:
A: 10-(2-dimethylaminoethoxy)-10,11-dihydrodibenzo[b,f][1,4]thiazepin-11-one acid maleate.
B: 10-(2-dimethylaminoethoxy)-10,11-dihydrodibenzo[b,f][1,4]oxazapin-11-one acid maleate.
C: 8-chloro-10-(2-dimethylaminoethoxy)-10,11-dihydrodibenzo[b,f][1,4]thiazepin-11-one acid maleate.
D: 10-(2-dimethylaminoethoxy)-8-methyl-10,11-dihydrodibenzo[b,f][1,4]thiazepin-11-one acid maleate.
E: 10-(2-dimethylaminoethoxy)-8-methylthio-10,11-dihydrodibenzo[b,f][1,4]thiazepin-11-one acid maleate.
F: 7-chloro-10-(2-dimethylaminoethoxy)-10,11-dihydrodibenzo[b,f][1,4]thiazepin-11-one acid maleate.
G: 10-{2-[4-(2-hydroxyethyl)-1-piperazinyl]ethoxy}-10,11-dihydrodibenzo[b,f][1,4]thiazepin-11-one dihydrochloride.
H: 7-chloro-10-(2-dimethylaminoethoxy)-5-methyl-10,11-dihydro-5H-dibenzo[b,e][1,4]diazepin-11-one acid fumarate.
I: 10-{2-dimethylaminoethoxy)-5-methyl-8-trifluoro-methyl-10,11-dihydro-5H-dibenzo[b,e][1,4]diazepin-11-one acid oxalate.
J: 5-methyl-10-(2-morpholinoethoxy)-10,11-dihydro-5H-dibenzo[b,e][1,4]diazepin-11-one acid maleate.
K: 10-(2-isopropylaminoethoxy)-5-methyl-10,11-dihydro-5H-dibenzo[b,e][1,4]diazepin-11-one acid oxalate.
L: 5-methyl-10-(2-methylaminoethoxy)-10,11-dihydro-5H-dibenzo[b,e][1,4]diazepin-11-one acid fumarate.

Owing to the remarkable pharmaceutical activities and low toxicity, the compounds of the invention are useful as antiallergic agents or antidepressants in the form of pharmaceutical compositions in admixture with a suitable and conventional carrier or adjuvant, administrable orally or by way of injection, without giving harm to the host.

The pharmaceutical compositions may take the form of tablets, granules, powders, syrups or injectable solutions, and may be administered orally or parenterally, usual daily doses lying in the range of 25 to 300 milligrams per human adult. These compositions are especially useful in the relief of depressant conditions and, more especially in the treatment of allergic conditions, specifically urticaria, eczema, allergic rhinitis, asthma and hay fever.

The numbering of the positions according to the present invention is shown as follows:

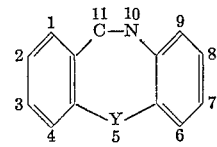

EXAMPLE 1

10 - hydroxy - 10,11 - dihydrodibenzo[b,f][1,4]thiazepin-11-one (24 grams) is dissolved in 100 milliliters of dimethylformamide, 15 grams of potassium carbonate and 17 grams of 2-dimethylaminoethyl methanesulfonate are added, and the reaction is carried out at 50° to 60° C. for 4 hours. The mixture is then poured into a large amount of ice water. The oil separated is taken up with benzene, the benzene layer is extracted with hydrochloric acid, and the aqueous extract layer is made alkaline with sodium hydroxide. The oil separated is taken up with benzene and dried over sodium sulfate. After removal of the benzene by distillation, the residue, which solidifies on standing, is recrystallized from a mixture of hexane and benzene to give 10-(2-dimethylaminoethoxy) - 10,11 - dihydrodibenzo [b,f][1,4]thiazepin-11-one in 70% yield. It melts at 119° to 120° C., and its acid maleate at 130° to 131° C.

EXAMPLE 2

10 - hydroxy - 10,11 - dihydrodibenzo[b,f][1,4]oxazepin-11-one (1.9 grams) is dissolved in 10 milliliters of dimethylformamide, and 2.5 grams of potassium carbonate and 1.5 grams of 2-dimethylaminoethyl chloride are added. The reaction is carried out at 40° to 45° C. for 4 hours. The reaction mixture is treated as in Example 1 to give 10-(2-dimethylaminoethoxy)-10,11-dihydrodibenzo[b,f][1,4]oxazepin-11-one in 75.3% yield. It occurs as an oil, and its acid maleate melts at 113° to 114° C.

EXAMPLE 3

10 - hydroxy - 10,11 - dihydrodibenzo[b,f][1,4]thiazepin-11-one-5,5-dioxide (5.5 grams) is dissolved in 30 milliliters of dimethylformamide, and 6.2 grams of potassium carbonate and 3.5 grams of 2-dimethylaminoethyl chloride are added. The reaction is carried out at 50° C. for 4 hours. The reaction mixture is treated as in Example 1 to give 10-(2-dimethylaminoethoxy)-10, 11 - dihydrodibenzo[b,f][1,4]thiazepin - 11 - one - 5,5 - dioxide in 80% yield. It occurs as an oil, and its acid maleate melts at 157° to 158° C.

EXAMPLE 4

10 - hydroxy - 10,11 - dihydrodibenzo[b,f][1,4]thiazepin-11-one (9.8 grams) is dissolved in 75 milliliters of dimethylformamide, and 4.5 grams of sodium methoxide and 6.5 grams of 3-dimethylaminopropyl chloride are added. The reaction is carried out at 50° to 60° C. for 4 hours. The reaction mixture is treated as in Example 1 to give 10-(3-dimethylaminopropoxy)-10,11-dihydrodibenzo[b,f][1,4]thiazepin-11-one in 78.5% yield. It melts at 72° to 73° C., and its acid maleate melts at 124° to 125° C.

EXAMPLES 5 to 15

Other examples of compounds (I) which can be produced from a cyclic hydroxamic acid and an aminoalkyl halide in 63% to 92% yield in a manner similar to that described in Example 4 are:

10 - (2 - diethylaminoethoxy) - 10,11 - dihydrodibenzo [b,f][1,4]thiazepin-11-one, its hydrochloride melting at 179° to 180° C., 10 - (2 - dimethylaminopropoxy) - 10,11 - dihydrodibenzo[b,f][1,4]thiazepin - 11 - one, its acid maleate melting at 170° to 172° C., 8 - chloro - 10 - (2 - dimethylaminoethoxy) - 10,11 - dihydrodibenzo[b,f][1,4]thiazepin-11-one, its acid maleate melting at 149° to 150° C., 10 - (2 - dimethylaminoethoxy) - 8 - methyl - 10,11 - dihydrodibenzo[b,f][1,4]thiazepin-11-one, its acid maleate melting at 153° to 154° C., 10 - (2 - dimethylaminoethoxy) - 8 - methylthio - 10,11-dihydrodibenzo[b,f][1,4]thiazepin-11-one melting at 97° to 98° C., its acid maleate melting at 164° to 165° C., 10 - (2 - dimethylaminoethoxy) - 8 - trifluoromethyl - 10,11-dihydrodibenzo[b,f][1,4]thiazepin-11-one, its acid maleate melting at 165° to 166° C., 7 - chloro - 10 - (2 - dimethylaminoethoxy) - 10,11 - dihydrodibenzo[b,f][1,4]thiazepin-11-one, its acid maleate melting at 149° C., 10 - (2 - dimethylaminoethoxy) - 7 - methoxy - 10,11-dihydrodibenzo[b,f][1,4]thiazepin-11-one, its acid maleate melting at 147° to 148° C., 10 - (3 - piperidinopropoxy) - 10,11 - dihydrodibenzo [b,f][1,4]thiazepin-11-one melting at 72° to 74° C., its acid maleate melting at 171° to 172° C., 2,7 - dichloro - 10 - (2 - dimethylaminoethoxy) - 10,11-dihydrodibenzo[b,f][1,4]thiazepin-11-one, its acid maleate melting at 140° C., and 10 - (2 - cyclohexylaminoethoxy) - 10,11 - dihydrodibenzo[b,f][1,4]thiazepin-11-one, its acid oxalate melting at 200° C.

EXAMPLE 16

A mixture of 7 grams of 10-(2-bromoethoxy)-10,11-dihydrodibenzo[b,f][1,4]thiazepin-11-one, 5 grams of morpholine, 0.5 gram of potassium iodide and 70 milliliters of ethanol are heated at 50° C. for 3 hours. Then the ethanol is distilled off, and 50 milliliters of dilute hydrochloric acid is added to the residue. The unreacted 10 - (2 - bromoethoxy) - 10,11 - dihydrodibenzo[b,f] [1,4]thiazepin-11-one is removed by extraction with benzene. The aqueous layer is made alkaline with sodium hydroxide, the separated oil is extracted with benzene, the extract is washed with water, and the benzene is then distilled off. The remaining crude product is recrystallized from a mixture of hexane and ethyl acetate to give 10 - (2 - morpholinoethoxy) - 10,11 - dihydrodibenzo [b,f][1,4]thiazepin-11-one melting at 90° to 91° C. in 72% yield. Its acid fumarate melts at 161° to 162° C.

EXAMPLES 17 TO 23

Other examples of compounds (I) which can be produced from a 10-(haloalkoxy)-10,11-dihydrodibenzo[b,f] [1,4]thiazepin-11-one and an amine in a manner similar to that described in Example 16 in 52 to 79% yield are:

10 - (2 - piperidinoethoxy) - 10,11 - dihydrodibenzo[b,f] [1,4]-thiazepin-11-one melting at 109° to 110° C., its acid fumarate melting at 159° to 160° C., 10-[2 - (4 - methyl-1-piperazinyl)ethoxy]-10,11-dihydrodibenzo[b,f][1,4]thiazepin-11-one melting at 100° to 101° C., its dihydrochloride melting at 210° to 212° C., 10-{2-[4-(2-hydroxyethyl)-1-piperazinyl]ethoxy} - 10,11- dihydrodibenzo[b,f][1,4]thiazepin-11-one, its dihydrochloride melting at 210° C., 10-(2-isopropylaminoethoxy)-10,11 - dihydrodibenzo[b,f] [1,4]thiazepin-11-one, its acid maleate melting at 159° to 160° C., 10-(2-methylaminoethoxy) - 10,11 - dihydrodibenzo[b,f] [1,4]thiazepin-11-one, its acid maleate melting at 177° to 178° C., and 10-[2-(1-methyl-2-phenylethylamino)ethoxy] - 10,11 - dihydrodibenzo[b,f][1,4]thiazepin-11-one, its hydrochloride melting at 160° to 162° C.

10-(2-methylaminoethoxy) - 10,11 - dihydrodibenzo[b,f] [1,4]oxazepin-11-one is also prepared similarly, its acid maleate melting at 163° to 164° C.

EXAMPLE 24

10-hydroxy-5-methyl-10,11-dihydro - 5H - dibenzo[b,e] [1,4]diazepin-11-one (4.8 grams, M.P. 181–183° C.) is dissolved in 40 milliliters of dimethylformamide, and 1.4 grams of sodium ethoxide is added. The mixture is stirred at 40° to 45° C. for 30 minutes. To this solution is added 2.5 grams of 2-dimethylaminoethyl chloride, and the whole is heated at 50° C. to 55° C. for 4 hours. Then it is poured into a large amount of water. The oil separated is taken up with toluene, the toluene layer is extracted with 10% hydrochloric acid, the aqueous extract layer is made alkaline with aqueous ammonia, the separated oil is taken up with chloroform, and the extract layer is washed with water, dried over sodium sulfate and concentrated. The residual oil (6 grams) is dissolved in isopropanol and treated with oxalic acid to give 10-(2-dimethylaminoethoxy)-5-methyl-10,11-dihydro - 5H - dibenzo[b,e][1,4] diazepin-11-one hydrogen oxalate melting at 166.5° C.

EXAMPLE 25

10-hydroxy-5-methyl-10,11-dihydro - 5H - dibenzo[b,e] [1,4]diazepin-11-one (4.8 grams) is dissolved in 70 milliliters of dioxane, 1.4 grams of sodium ethoxide is added, and the mixture is stirred at 40° to 45° C. for 2 hours. To this solution is added 5.2 grams of 3-dimethylaminopropyl p-toluenesulfonate. Then reaction is carried out at 55° to 60° C. for 6 hours. The reaction mixture is treated as in Example 24 to give an oil (5.4 grams), which is dissolved in isopropanol and treated with fumaric acid. There is obtained 5.8 grams of 10-(3-dimethylaminopropoxy)-5-methyl-10,11-dihydro - 5H - dibenzo]b,e][1,4] diazepin-11-one hydrogen fumarate melting at 143° to 145° C.

EXAMPLE 26

7-chloro-10-hydroxy-5-methyl-10,11 - dihydro - 5H-dibenzo[b,e][1,4]diazepin-11-one (5.5 grams, M.P. 173.5–174.5° C.) is dissolved in 50 milliliters of dimethylformamide, 1.4 grams of sodium ethoxide is added, and the mixture is stirred at 40° to 45° C. for 30 minutes. To this solution is added 2.5 grams of 2-dimethylaminoethyl chloride, and the whole is heated at 50° to 55° C. for 4 hours and then treated as in Example 24. The remaining oil is crystallized from ligroin to give 5.6 grams of 7-chloro-10-(2-dimethylaminoethoxy) - 5 - methyl - 10,11-dihydro-5H-dibenzo[b,e][1,4]diazepin-11-one melting at 115° C. Its acid fumarate obtained by treatment with fumaric acid in isopropanol melts at 160° to 161° C.

EXAMPLE 27

10-hydroxy-5-methyl-10,11-dihydro - 5H - bibenzo[b,e] [1.4]diazepin-11-one (4.8 grams) is dissolved in 40 milliliters of dioxane, 1.1 grams of sodium methoxide is added, and the mixture is stirred at 50° to 55° C. for 30 minutes. To this solution is added 7.5 grams of ethylene bromide and the whole is kept at 50° to 55° C. for 4 hours. The reaction mixture is poured into a large amount of water, the oil separated is taken up with chloroform, and the chloroform layer is washed with water, dried over sodium sulfate and concentrated. 10-(2-bromoethoxy)-5-methyl-10,11-dihydro-5H-dibenzo[b,e][1,4]diazepin-11-one is obtained as a viscous oil (6.8 grams).

This is dissolved in 40 milliliters of ethanol, 4 grams of isopropylamine is added, and the whole is kept at 50° to 55° C. for 6 hours. The reaction mixture is poured into water, the separated oil is taken up with toluene, the toluene layer is extracted with 10% hydrochloric acid and the extract is made alkaline with aqueous ammonia. The oil separated is taken up with chloroform, washed with water and concentrated. Crystallization of the residual oil from hexane gives 4 grams of 10-(2-isopropylaminoethoxy)-5-methyl-10,11-dihydro-5H - dibenzo[b,e][1,4]diazepin-11-one melting at 87° C. Its acid oxalate melts at 167° C.

EXAMPLE 28

In a manner similar to that described in Example 27, 7 grams of 10-(2-bromoethoxy)-5-methyl-10,11-dihydro-5H-dibenzo[b,e][1,4]diazepin-11-one and 3 grams of phenethylamine are allowed to react in 40 milliliters of ethanol in the presence of 4.5 grams of triethylamine and 0.3 gram of potassium iodide and the reaction mixture is treated similarly as in Example 27 to give 4.5 grams of 5-methyl-10-(2-phenethylaminoethoxy)-10,11 - dihydro-5H-dibenzo[b,e][1,4]diazepin-11-one. Its acid oxalate melts at 156° to 157° C.

EXAMPLES 29 TO 37

The following compounds (I), for example, are similarly prepared:

5-methyl-10-[3-(4-methyl-1-piperazinyl)propoxy] - 10,11-dihydro-5H-dibenzo[b,e][1,4]diazepin-11 - one melting at 102° C., its hydrochloride melting at 208° C., 10-(2-dimethylaminoethoxy)-5-methyl-8-trifluoromethyl-10,11-dihydro-5H-dibenzo[b,e][1,4]diazepin-11-one, its acid oxalate melting at 179° C., 5-methyl-10-(2-morpholinoethoxy)-10,11-dihydro-5H-dibenzo[b,e][1,4]diazepin-11-one melting at 130° C., its acid maleate melting at 130.5° to 132° C., 5-methyl-10-(2-piperidinoethoxy)-10,11-dihydro-5H-dibenzo[b,e][1,4]diazepin-11-one, its acid oxalate melting at 156° C., 2,7-dichloro-10-(2-dimethylaminoethoxy)-5-methyl-10,11-dihydro-5H-dibenzo[b,e][1,4]diazepin-11-one melting at 126° to 127° C., its acid fumarate melting at 172° to 173.5° C., 10-(2-dimethylaminoethoxy)-5-methyl-8-methylthio-10,11-dihydro-5H-dibenzo[b,e][1,4]diazepin-11-one melting at 95° to 97° C., 5-methyl-10-(2-methylaminoethoxy)-10,11-dihydro-5H-dibenzo[b,e][1,4]diazepin-11-one, its acid fumarate melting at 127° to 129° C., 10-(2-dibutylaminoethoxy)-5-methyl-10,11-dihydro-5H-dibenzo[b,e][1,4]diazepin-11-one, its acid oxalate melting at 127° to 129° C. with decomposition, and 10-(2-cyclohexylaminoethoxy)-5-methyl-10,11-dihydro-5H-dibenzo[b,e][1,4]diazepin-11-one melting at 124° to 126° C., its acid oxalate melting at 174° to 175° C.

What is claimed is:

1. A compound of the formula

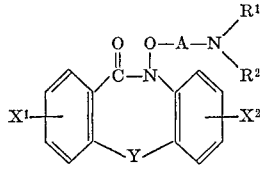

wherein $X^1$ and $X^2$ are the same or different and each is —NR$^1$)R$^2$ is lower alkylamino, di(lower alkyl)amino, trifluoromethyl, Y is —O—, —S—, —SO$_2$— or —N(R)— (R being lower alkyl), A is C$_{2-4}$ alkylene, and —NR$^1$)(R$^2$) is lower alkylamino, di(lower alkyl)amino, cyclohexylamino, (phenyl-lower alkyl)amino, piperidino, morpholino, 4-lower alkyl-1-piperazinyl or 4-(hydroxy-lower alkyl)-1-piperazinyl, wherein "lower" means that the alkyl moiety or alkoxy moiety contains not more than 4 carbon atoms.

2. A pharmaceutically acceptable acid addition salt of a compound according to claim 1.

3. A compound of the formula

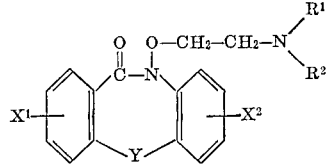

wherein $X^1$ and $X^2$ are the same or different and each is H, Cl, CH$_3$, CH$_3$O, CH$_3$S or CF$_3$, Y is —O—, —S— or —N(CH$_3$)—, and —N(R$^1$)(R$^2$) is methylamino, isopropylamino, dimethylamino, cyclohexylamino, morpholino or 4-(2-hydroxyethyl)-1-piperazinyl.

4. A pharmaceutically acceptable acid addition salt of a compound according to claim 3.

5. A compound according to claim 3, said compound being 10-(2-dimethylaminoethoxy)-10,11-dihydrodibenzo[b,f][1,4]thiazepin-11-one.

6. A compound according to claim 3, said compound being 10-(2-dimethylaminoethoxy)-10,11-dihydrodibenzo[b,f][1,4]oxazepin-11-one.

7. A compound according to claim 3, said compound being 8-chloro-10-(2-dimethylaminoethoxy)-10,11-dihydrodibenzo[b,f][1,4]thiazepin-11-one.

8. A compound acocrding to claim 3, said compound being 10-(2-dimethylaminoethoxy)-8-methyl-10,11-dihydrodibenzo[b,f][1,4]thiazepin-11-one.

9. A compound according to claim 3, said compound being 10-(2-dimethylaminoethoxy)-8-methylthio-10,11-dihydrodibenzo[b,f][1,4]thiazepin-11-one.

10. A compound according to claim 3, said compound being 7-chloro-10-(2-dimethylaminoethoxy)-10,11-dihydrodibenzo[b,f][1,4]thiazepin-11-one.

11. A compound according to claim 3, said compound being 10-{2-[4-(2-hydroxyethyl)-1-piperazinyl]ethoxy}10,11-dihydrodibenzo[b,f][1,4]thiazepin-11-one.

12. A compound according to claim 3, said compound being 7-chloro-10-(2-dimethylaminoethoxy)-5-methyl-10,11-dihydro-5H-dibenzo[b,e][1,4]diazepin-11-one.

13. A compound according to claim 3, said compound being 10-(2-dimethyl-aminoethoxy)-5-methyl-8-trifluoromethyl - 10,11-dihydro-5H-dibenzo[b,e][1,4]diazepin-11-one.

14. A compound according to claim 3, said compound being 5-methyl-10-(2-morpholinoethoxy)-10,11-dihydro-5H-dibenzo[b,e][1,4]diazepin-11-one.

15. A compound according to claim 3, said compound being 10-(2-isopropylaminoethoxy)-5-methyl-10,11-dihydro-5H-dibenzo[b,e][1,4]diazepin-11-one.

16. A compound according to claim 3, said compound being 10-(2-cyclohexylaminoethoxy)-5-methyl-10,11-dihydro-5H-dibenzo[b,e][1,4]diazepin-11-one.

17. A compound according to claim 3, said compound being 5-methyl-10-(2-methylaminoethoxy)-10,11-dihydro-5H-dibenzo[b,e][1,4]diazepin-11-one.

References Cited

UNITED STATES PATENTS 3,419,547   12/1968   Schmutz et al. _____ 260—239.3

HENRY R. JILES, Primary Examiner

R. T. BOND, Assistant Examiner

U.S. Cl. X.R.

424—244, 248, 250, 267